United States Patent

[11] 3,633,775

| [72] | Inventor | Albert J. Pugliese |
| | | 320 Main Street, New Rochelle, N.Y. 10801 |
| [21] | Appl. No. | 29,618 |
| [22] | Filed | Apr. 17, 1970 |
| [45] | Patented | Jan. 11, 1972 |

[54] SERVICE VEHICLE
2 Claims, 3 Drawing Figs.

[52] U.S. Cl. .................................................... 214/506,
214/85.1, 214/517
[51] Int. Cl. ..................................................... B60p 1/28
[50] Field of Search............................................ 214/505,
85.5, 506, 85.1, 515, 517; 267/63, 65, 34

[56] References Cited
UNITED STATES PATENTS

| 2,706,009 | 4/1955 | Schramm | 214/506 X |
| 2,774,604 | 12/1956 | Rendel et al. | 214/506 X |
| 2,957,593 | 10/1960 | Evans | 214/506 |
| 3,434,708 | 3/1969 | Hawk, Jr. | 267/63 |
| 1,013,808 | 1/1912 | Palmer | 267/34 |
| 2,838,191 | 6/1958 | Schramm | 214/505 |

*Primary Examiner*—Albert J. Makay
*Attorney*—Alfred E. Miller

ABSTRACT: A service vehicle in which the rear chassis can be lowered to a ground-engaging position to haul up a wrecked vehicle on the rear chassis body. The rear chassis may be elevated to its normal riding condition after the wrecked vehicle is on the rear chassis. The lowering and elevation of the chassis body may be accomplished either pneumatically or hydraulically.

PATENTED JAN 11 1972　　　　　　　　　　3,633,775
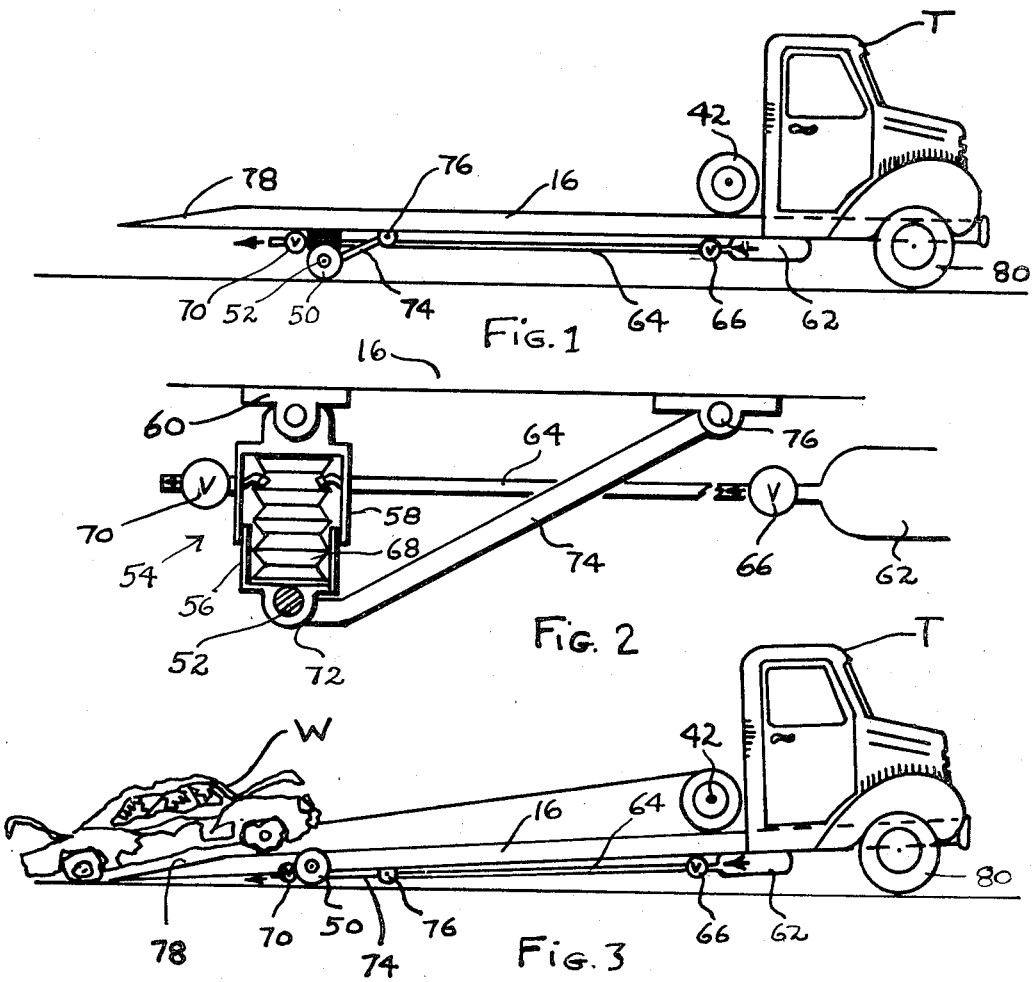
INVENTOR.
ALBERT J. PUGLIESE
BY
Alfred E. Miller
ATTORNEY

SERVICE VEHICLE

In previous service vehicle constructions the auto wrecker was provided with a boom and cable together with a power winch. If a damaged auto was freely towed on two wheels with the other two wheels elevated, there was the ever present danger that a sudden stop made by the auto wrecker would cause the damaged auto to collide with the rear of the wrecker vehicle and thereby cause further damage to the auto, which, of course, the towing company was responsible for.

In order to overcome the aforesaid serious disadvantage of the prior art constructions, the present invention provides a service vehicle which does not use a boom, but is an engine-over-cab truck which has an elongated rear chassis that can be selectively raised and lowered. In this connection, the chassis may be lowered to ground-engaging position at the extreme end thereof wherein a ramp is formed to permit a wrecked auto to be pulled up on the chassis body by a power winch. When the wreck is located on the chassis body, the latter may be elevated to a normal driving position.

It is to be understood that the present service vehicle can be used not only as a tow truck for wrecked or disabled vehicles but can also be utilized as a transport for furniture, pianos and other heavy and bulky items. In this connection, the ramplike exterior of the chassis can be lowered to the ground-engaging position and the furniture or other heavy and bulky items can be rolled, hauled or pushed up the ramp on to the chassis.

The above and other features, objects and advantages of the present invention will be fully understood from the following description considered in connection with the accompanying drawings.

FIG. 1 is a side elevation view of the service vehicle with the elongated rear chassis constructed in accordance with the teachings of the present invention, and at the normal riding position.

FIG. 2 is an enlarged elevation view of an important detail of the construction of the present invention, and FIG. 3 is a side elevation view of the service vehicle illustrated in FIG. 1 with the rear chassis lowered to ground-engaging position.

PREFERRED EMBODIMENT OF THE INVENTION

FIGS. 1, 2 and 3 disclose the construction of the present invention in which the rear chassis 16 is provided with wheels 50 mounted on an axle 52. The axle 52 is fixed to a lower section 56 of the telescoping housing referred to generally by the numeral 54. The upper section 58 of the telescoping housing 54 is connected to a bracket 60 secured to the underside of the rear chassis 16. A compressed air tank 62 is preferably mounted adjacent to the cab for selectively releasing compressed air from the tank 62. The outlet conduit 64 from the compressed air tank 62 is provided with a one-way valve 66 which permits compressed air from the tank 62 to enter bellows 68. The supply of compressed air from the tank 62 is controlled by a suitable control means (not shown). A second one-way valve 70 permits the compressed air in the bellows to be evacuated into the atmosphere when desired. An arm 74 is secured at one end of the axle bearing 72 and is pivoted at the other end thereof to the underside of rear chassis 16 at 76.

FIGS. 1 and 2 show the truck chassis with the bellows 68 filled with compressed air and the chassis in an elevated position for normal driving use of the service vehicle. However, FIG. 3 illustrates the service vehicle with the compressed air in the tank 62 evacuated to the atmosphere and the bellows retracted whereby telescoping sections 56 and 58 of the telescoping housing 54 are at a maximum telescoping relationship and the bellows 68 is evacuated. Thus, the end of the chassis 16 drops to the ground forming a ramp 78 upon which a wrecked vehicle W is hauled up by the cable of the winch 42 in order to place the wreck forward of the wheel 50. It should be noted that the rear chassis 16 is in effect a lever arm which pivots about the fulcrum at the front wheel 80.

Thus, the wreck W can be hauled up on the truck chassis 16 and is transported thereon without the danger of further damage being caused to the damaged automobile, which might be the case if the damaged vehicle was towed in the conventional manner on two wheels by means of a wrecker boom. In the latter case, a sudden stop of the wrecker vehicle might cause the towed auto to collide with the rear of the wrecker vehicle and cause further damage to the previously damaged automobile.

What I claim is:

1. A service vehicle provided with a motor-driven cab and an elongated rear chassis with at least one pair of ground-engaging rear wheels remote from said cab, a ramplike section forming the extreme end of said rear chassis adjacent to said rear wheels, a bellows and a source of compressed air for selectively elevating and lowering said rear chassis, means mounting said bellows including two telescoping sections, one of said sections being rigidly connected to said chassis while the other of said telescoping sections being operatively connected to the axle of said rear wheels, a metallic stiffening member connected at one end to said axle and pivotally connected at the other end to said chassis which permits substantial vertical movement of said bellows and restricts lateral movement thereof, a first valve means for selectively permitting the supply of compressed air to said bellows, and second valve means permitting said compressed air in said bellows to be selectively evacuated to the atmosphere.

2. A service vehicle as claimed in claim 1 wherein said chassis pivots on the forward pair of wheels.

* * * * *